SHALE     LIMESTONE

INVENTOR.
JOHN C. WILSON
BY
Russell E. Schloff
ATTORNEY

United States Patent Office 3,308,426
Patented Mar. 7, 1967

3,308,426
METHOD AND APPARATUS FOR ACOUS-
TICAL LOGGING WHEREIN THE AM-
PLITUDE AND FREQUENCY OF THE
IMPULSE ARE DETERMINED
John C. Wilson, Houston, Tex., assignor to Dresser Industries, Inc., Dallas, Tex., a corporation of Delaware
Filed Nov. 1, 1963, Ser. No. 320,790
6 Claims. (Cl. 340—18)

This invention relates to methods and apparatus for logging boreholes and is particularly directed to method and apparatus for acoustic well logging which may be employed for numerous purposes.

The completion of oil and gas wells involves the positioning of steel casing within the well bore and introduction of cement into the annular space between the well bore and the outside of the casing to permit selective production from a particular level or levels. In order to produce the well, the operator perforates the casing and the cement annulus, usually by explosives, at levels believed to be adjacent oil or gas bearing formations. The location of the zones of probable productivity is frequently determined before the setting of the casing by the running of an electric log, but it is usually desirable to correlate the electric log with a radioactivity log subsequent to the setting of the casing and prior to perforation.

It is also desirable to perforate a potentially productive zone in those portions wherein a good bond has been formed between the casing and the surrounding cement sheath. This is because cement imperfections, such as the presence of voids or channels, in the cement sheath permits fluids from adjacent zones to flow into the perforations and mix with the desired fluids, or, in some cases, substantially inhibit their production. It is advantageous, therefore, to run a test of the effectiveness of the cement bond around the casing prior to perforation. Heretofore, such a log has involved the transmission of a voltage pulse or pulses of significant amplitude from the tool through a conductor to surface recording equipment. Because the amplitude of these pulses had to be measured accurately, special pains had to be taken to avoid interference by other pulses transmitted on the same conductor.

The running of radioactivity and cement bond logs prior to perforation of a well is fairly expensive because separate mobile units have heretofore been necessary for running the radioactivity and cement bond logs on one hand and the perforating equipment on the other. This is because perforating trucks are customarily equipped with only a single insulated conductor sheathed cable used to support and actuate perforating equipment whereas combination logging equipment normally requires the use of a multiconductor cable. When a multiconductor cable is used to transmit two different logging signals in pulse rate form, each signal transmitted over a different pair of conductors, special precautions must be taken to minimize induced pulses or "cross-talk" that distort the logging signals.

These disadvantages of the prior art are overcome with the present invention and novel methods and apparatus are provided whereby the frequency of the pulses in the echo train of the cement bond log are analyzed to provide an additional curve which may be employed for correlation with other porosity logs, such as those made before setting of the casing, and may also be employed to locate fractures in the formations surrounding the borehole or to indicate areas of poor bonding between the cement and the formations.

The advantages of the present invention may be easily attained by connecting a counting rate meter in parallel with the conventional surface equipment of a cement bond logging system and recording the frequency of the pulses of the echo trains of the cement bond log as a function of depth. It has been found that this frequency is functionally related to the porosity of the formations surrounding the borehole and that logs made in this manner will correlate well with other porosity logs. Hence, the need for running other porosity logs together with the cement bond log is overcome. Moreover, since the method of of the present invention utilizes the pulses of the cement bond log, interference from other signals is avoided without the necessity of additional cable conductors.

Accordingly, it is an object of the present invention to provide novel methods and apparatus for correlating two-curve cement bond logs with porosity logs made prior to setting of casing.

Another object of the present invention is to provide novel methods and apparatus for deriving correlative information from the echo train of a cement bond log.

A further object of the present invention is to provide novel methods and apparatus for correlative information useful in locating fractures in the formations surrounding a borehole.

A specific object of the present invention is to provide a novel logging method comprising the steps of continuously measuring the frequency of the pulses in the echo trains of cement bond logging signal, and recording as a separate curve said frequency as a function of depth to provide a correlative indication of the porosity of the formations surrounding the borehole.

Another specific object of the present invention is to provide novel apparatus for well logging comprising a subsurface instrument for submitting an acoustic echo pulse train, surface equipment for measuring at least one characteristic of the pulses in said echo train, a counting rate meter for measuring the frequency of pulses in said echo train, and means for recording said frequency as a function of depth.

These and other objects and features of the present invention will be apparent from the following detailed description taken with reference to the figures of the accompanying drawings.

In the drawings:

FIG. 4 is a representation of a portion of a log made with the apparatus of FIG. 1 and reflecting the conditions illustrated in FIG. 1.

Figure 1:
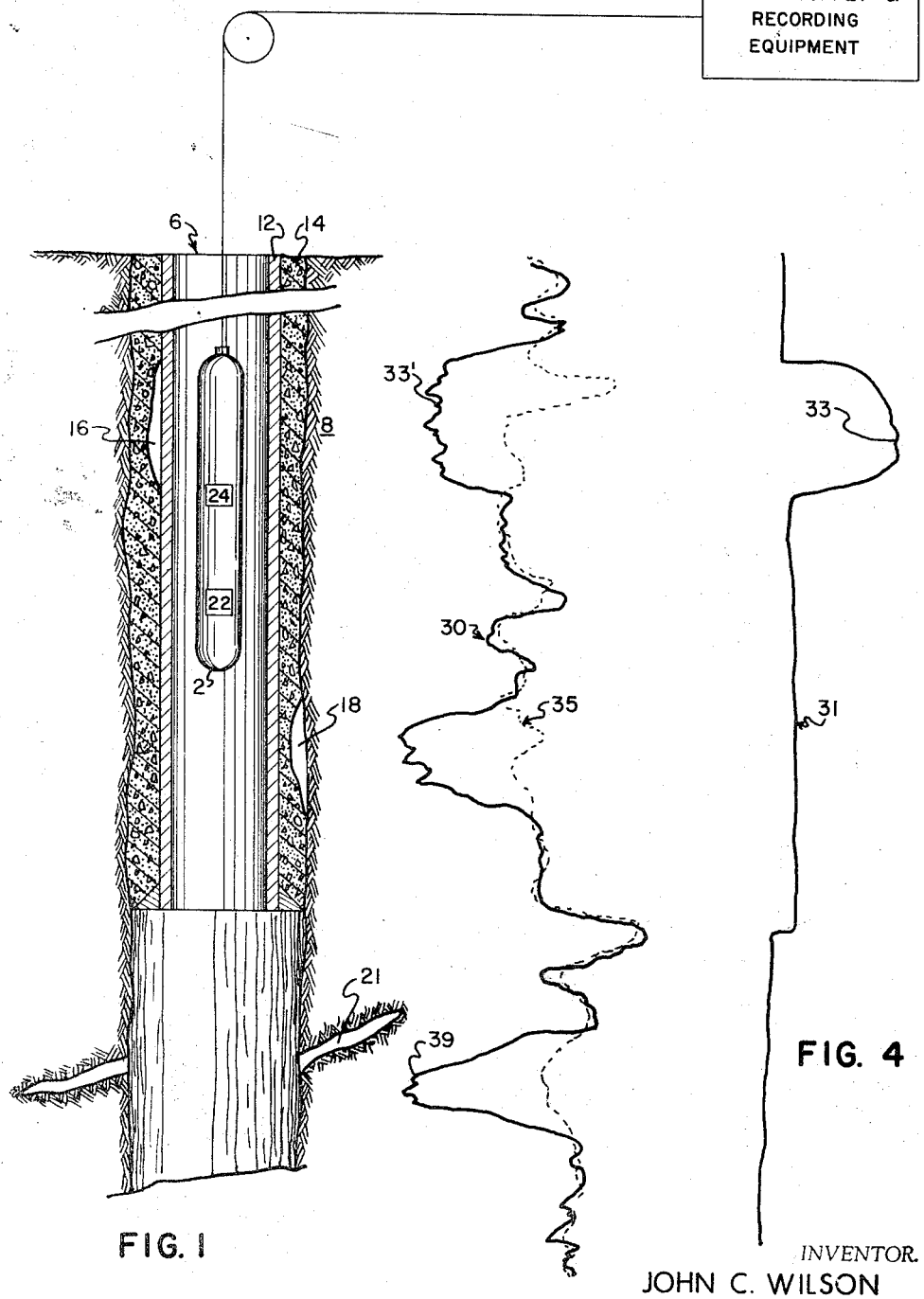
FIG. 1 is a diagrammatic representation illustrating a logging tool, embodying the present invention, positioned within a cased borehole.
Figure 2:
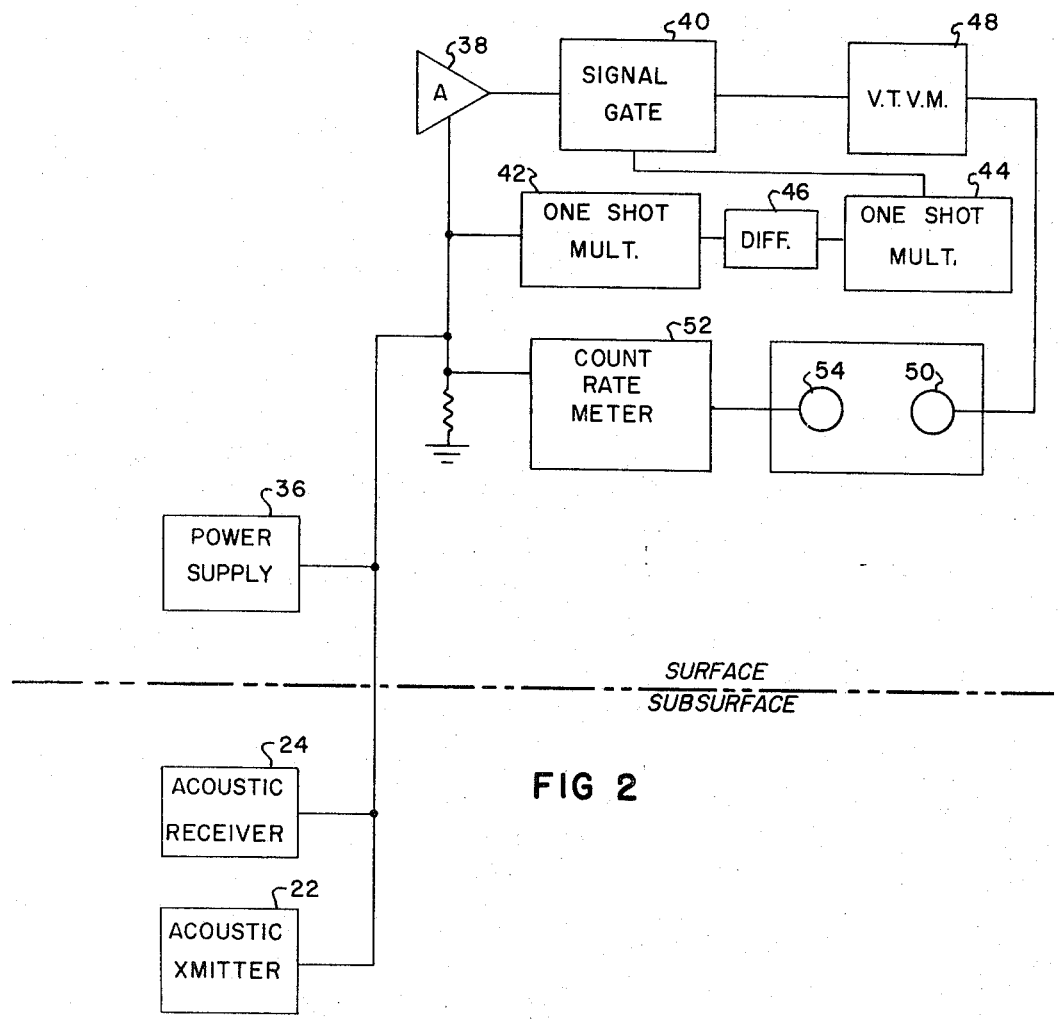
FIG. 2 is a block diagram of the electronic circuitry of the apparatus of FIG. 1.

In that form of the present invention chosen for purposes of illustration in the drawing, FIG. 1 shows a subsurface instrument 2 suspended by means of a cable 4 in a borehole 6 which penetrates the earth formations 8. The cable 4 serves to traverse the instrument 2 through the borehole 6 and provides electrical connection between the subsurface instrument 2 and suitable surface equipment, indicated generally at 10.

A portion of the borehole 6 is lined with casing pipe 12 which is secured in place by cement 14 which has been pumped into the annular space between the casing pipe 12 and the formations 8. Frequently, the cement sheath 14 will not properly fill this annular space with the result that the cement 14 may form a poor bond with the casing 12, as indicated at 16, or with the formation 8, as indicated at 18. Below the bottom of the casing 12 is open hole with the formation 8 containing a fracture 21.

In conventional cement bond logging, a series of acoustic shock waves are emitted by an acoustic transmitter, indicated at 22 in the subsurface instrument 2, to set up acoustic echo pulse trains, which travel through a portion of the adjacent casing 12 and are detected by appropriate receiver means 24, contained within the subsurface instrument 2 and spaced a predetermined distance from the transmitter 22. The detected echo pulse trains are then transmitted electrically to the surface equipment 10, where the amplitude of one or more of the pulses of the echo train are measured and the measurement is recorded as a function of depth to provide a log. Since the pulse amplitude is a function of the tightness with which the casing 12 is secured by the cement 14, this log will provide indications of poor bonds between the casing 12 and the cement 14, such as are shown at 18 and 20 in FIG. 1. However, the conventional cement bond logs will not indicate poor bonding between the cement 12 and the formations 8, as indicated at 16 in FIG. 1.

As indicated above, it has been customary heretofore to run a porosity log prior to setting of the casing to determine whether the borehole penetrates any formations which may be capable of producing oil. If it does, the casing is set and cemented and a cement bond log is run to ascertain the character of the cement, thereby determining the most advantageous location in a potential producing zone for performing perforating operations. Simultaneously, it has been the general practice to run a second porosity log in order to accurately correlate the cement bond log with the initial porosity log. However, this has presented serious problems of signal interference and has necessitated the use of a plurality of mobile units, multiconductor cable or complex and expensive electronic circuitry.

Figure 3:
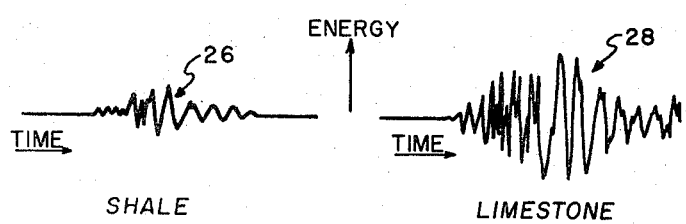
FIG. 3 is a diagrammatic representation of a plurality of acoustic echo pulse trains such as are generated by the subsurface instrument of FIG. 1.

In accordance with the present invention, it has been found that the frequency of the pulses in the acoustic echo pulse train of the cement bond log is a function of the character of the formations, including porosity, surrounding the borehole and of the acoustic coupling between the cement and these formations. Where the formations are relatively porous, such as shales, the frequency of the pulses in the echo train will be relatively low, as indicated at 26 in FIG. 3. In contrast, where the formations are non-porous, such as limestones, the frequency of the pulses will be relatively high, as indicated at 28 in FIG. 3. Thus, by continuously counting the number of pulses occurring in the echo train and recording this number as a function of depth, it is possible to provide a frequency curve, as shown by curve 30 of FIG. 4, in addition to the normal cement bond by curve 31. The frequency curve 30 can be used in correlation with the initial porosity log made prior to setting of the casing.

Since the method of the present invention involves measurement of a characteristic of the same signals from which the cement bond log is derived, no additional signals are required which might tend to interfere with the signal normally required for the cement bond log. Consequently, the frequency curve derived by the present invention and the regular curve of the cement bond log may be obtained simultaneously on single conductor cable without the necessity of protecting against interfering signals. This increases the useability of the cement bond log and greatly reduces the complexity and expense of the equipment required for obtaining simultaneous but separate porosity and cement bond logs.

In addition, by comparing the frequency curve 30 of the present invention with other porosity logs, information can be obtained which has not been available heretofore. As noted above, the frequency curve 31 of the present invention is affected by the acoustic coupling between the cement 12 and the formations 8. Thus, as indicated at 32 on curve 30 of FIG. 4, the frequency will drop slightly adjacent areas where the cement is poorly bonded to the formations. Also, the number of pulses per acoustic wave train will decrease. Poor bonding of this type is not detected by the curve 31 of conventional cement bond logs but can be determined by comparing the log of the present invention with other porosity logs which are not affected by this coupling, such as the total amplitude acoustic log, a regular acoustic velocity log or other open hole logs which give an indication of porosity.

As can be seen in FIG. 4, the curve 31 is the normal response of a cement bond log and indicates the amplitude of the first arrival from the steel casing 12. The curve 31 indicates any poor bonding between the casing 12 and the cement sheath 14, as can be seen at 33, which reflects the poor bond 16 between casing 12 and cement sheath 14 in FIG. 1. On the other hand, curve 30 measures a combination of frequency per second and number of pulses per echo train. Since the acoustic pulse loses energy when it crosses an interface, it will also indicate poor bond between casing 12 and the cement sheath 14. However, it does not indicate it to the degree reflected by the regular cement bond log curve 31. See 33' on curve 30, where the deflection caused by poor bond 16 is not as great as deflection of curve 31.

It has been found that curve 30 correlates fairly closely with formation characteristics so long as there is a good bond between the formation 8 and the cement sheath 14 as well as a good bond between the casing 12 and the cement sheath 14. For example, in FIG. 4, curve 35 is a correlative open hole porosity curve which has been traced on the log to correlate curve 30, and it can be seen that in areas of good bond, curves 30 and 35 follow each other fairly closely. However, if the cement sheath 14 has not established a good bond with the formation 8, the total number of pulses per echo train will decrease and the curve 30 will shift away from the curve 35, which will indicate a poor bond between the cement sheath 14 and formation 8, such as shown at 32, which reflects the poor bond 18 between formation 8 and cement sheath 14. This cannot normally be ascertained from a regular cement bond curve. As can been seen in FIG. 4, the curve 31 does not indicate any irregularity opposite 32 in curve 30. Also, it is necessary to correlate a porosity log with curve 30 to determine whether deflection 37 results from formation characteristics or from a poor bond between formation and casing. As can be seen in FIG. 4, the frequency curve 30 had a significant shift 32 which was not reflected by the porosity log 35. Therefore, it can be determined that the shift 32 resulted from a poor bond between formation and casing and not as a result of change in formation characteristics.

The log of the present invention is also strongly sensitive to fractures in the formation, such as fracture 21 appearing in FIG. 1, and will show a sharp drop in frequency where such fractures occur, as indicated at 39 on curve 30 of FIG. 4. In contrast, the porosity log 35 is insensitive to such fractures. Consequently, a comparison of the frequency curve 30 with a porosity log 35 will show a lack of correlation in the region where a fracture 21 occurs.

To accomplish the method of the present invention, the subsurface instrument 2 may be a conventional cement bond logging tool having an acoustic transmitter 22 and an acoustic receiver 24 contained in the instrument 2 and spaced a predetermined distance from each other. The transmitter 22 emits successive, time-spaced acoustic shock waves which travel through the casing, cement and formations and set up acoustic echo trains. These echo trains are detected by the receiver 24 and are converted into corresponding electical signals which are transmitted over cable 4 to the surface equipment 10.

The surface equipment 10 includes a conventional D.C. power supply 36 which supplies energy to the surface equipment 10 and, through cable 4, the subsurface instrument. The surface equipment 10 also contains an amplifier 38 and a signal gate 40. Signal gate 40 is controlled by a time delay circuit which includes one-shot multivibrators 42 and 44 and differentiator 46, and serves to pass only selected portions of the echo pulse train from amplifier 38 to a vacuum tube voltmeter 48, and, thence, to suitable recording means 50, where the desired signals are recorded as functions of depth to provide the curve 31 of a cement bond log.

In addition, the echo pulse train is supplied to a counting rate meter 52 which counts the number of pulses occurring in the echo train per unit time and supplies a signal indicative of this number to a second recording means 54, which records the number as a function of depth. This value corresponds to the frequency of pulses of the echo train and provides the curve 30, which may be interpreted in accordance with the method of the present invention, as described above.

While the invention has been primarily described in connection with determining the characteristics of the cement sheath surrounding a casing in a borehole, it can also be used for basic investigating of the characteristics of formations surrounding uncased boreholes.

It will be apparent, from the foregoing description, that the method of the present invention can be accomplished with only slight modification of conventional cement bond logging equipment and may be readily performed on single conductor cable. Moreover, if desired, the cement bond log and the log of the present invention may be performed simultaneously with other types of logs with no more complexity than is encountered without the log of the present invention. Furthermore, numerous variations and modifications may be made without departing from the present invention.

While the preferred form of the invention has been shown and described, it is understood that various changes may be made by those skilled in the art without departing from the scope of the invention as defined in the appended claims.

I claim:

1. Apparatus for logging a formation pierced by a borehole containing a well casing and a cement sheath between the casing and formation to determine the effectiveness of the bond between the casing and cement sheath and between the cement sheath and the formation, said apparatus comprising:
   a subsurface instrument;
   surface equipment and a cable, said cable supporting said instrument and electrically connecting said instrument and said surface equipment; said instrument including:
      transmitter means for generating an acoustic shock wave,
      receiver means for detecting an acoustic echo pulse train resulting from said shock wave and converting said acoustic echo train into corresponding electrical signals; and
   means for applying said signals to said cable for transmission to said surface equipment; said surface equipment including:
      means connected to receive said signals from said cable for determining the amplitude of the first arrival of said signals and providing an indication of said amplitude,
      means connected to receive said signals from said cable for counting the number of pulses per unit time occurring in said echo train and providing an indication of said number, and
      means for recording said indications in correlation as a function of depth whereby irregularities in bonding of the cement sheath may be determined.

2. Apparatus for logging a formation pierced by a borehole containing a well casing and a cement sheath between the casing and formation to determined the effectiveness of the bond between the casing and cement sheath and between the cement sheath and the formation, said apparatus comprising:
   a subsurface instrument;
   surface equipment and a cable, said cable supporting said instrument and electrically connecting said instrument and said surface equipment; said instrument including:
      transmitter means for generating an acoustic shock wave,
      receiver means for detecting an acoustic echo pulse train resulting from said shock wave and converting said acoustic echo train into corresponding electrical signals; and
   means for applying said signals to said cable for transmission to said surface equipment; said surface equipment including:
      means connected to receive said signals from said cable for determining the amplitude of the first arrival of said signals and establishing a first indication indicative of a function of said amplitude,
      means connected to receive said signals from said cable for determining the frequency of the pulses in said echo train and establishing a second indication indicative of the value of said frequency, and
      means for correlatively recording said first and second indications as functions of depth whereby irregularities in bonding of the cement sheath may be determined.

3. The method of logging a formation pierced by a borehole containing a well casing and a cement sheath between the casing and formation to determine the effectiveness of the bond between the casing and cement sheath and between the cement sheath and the formation, said method comprising:
   emitting an acoustic shock wave at a first point in a borehole;
   detecting an acoustic echo pulse train at a second point in said borehole;
   converting said acoustic echo pulse train into corresponding electrical signals;
   transmitting said signals to the surface of the earth;
   determining the amplitude of the first arrival of said signals;
   establishing a first indication indicative of said amplitude;
   simultaneously determining the frequency of said signals;
   establishing a second indication indicative of the value of said frequency; and
   correlatively recording said indications as functions of depth whereby irregularities in bonding of the cement sheath may be determined.

4. The method of well logging comprising the steps of:
   emitting a series of acoustic shock waves at a first point in a borehole;
   detecting acoustic echo pulse trains at a second point in said borehole;
   converting said acoustic echo pulse trains into corresponding electrical signals;
   transmitting said signals to the surface of the earth;
   determining the value of a first characteristic of said signals;
   establishing a first indication indicative of said value;
   simultaneously determining the frequency of said signals;
   establishing a second indication indicative of the value of said frequency; and
   recording said indications as functions of depth;
   tracing over the frequency indication an indication indicative of the porosity of the formation traversed to determine whether the change in indication is a result of formation characteristics.

5. The method of simultaneously making a two-curve acoustic log by a logging tool moving through a borehole, said method comprising:
   periodically transmitting acoustic shock waves axially of said borehole;

receiving said periodically transmitted shock waves;
converting said shock waves into corresponding electrical signals;
transmitting said electrical signals to the surface;
determining the value of a first characteristic of said signals;
establishing a first indication indicative of said value;
simultaneously determining the value of a second characteristic of said signals indicative of the frequency of the signals;
establishing a second indication indicative of the value of said second characteristic;
recording said indication as a function of depth;
tracing over the indication of the second characteristic an indication of the porosity of the formation to determine whether deflections of the second characteristic are a result of change in formation characteristic.

6. The method of logging a formation pierced by a borehole containing a well casing and a cement sheath between the casing and formation to determine effectiveness of the bond between the casing and cement sheath and between the cement sheath and the formation, said method comprising:
    emitting an acoustic shock wave at a first point in a borehole;
    detecting an acoustic echo pulse train at a second point in said borehole;
    converting said acoustic echo pulsation into corresponding electrical signals;
    transmitting said signals to the surface of the earth;
    determining the amplitude for the first arrival of said signals affected principally by the bond between the casing and the cement sheath;
    establishing a first indication indicative of said amplitude;
    simultaneously determining from said signals the frequency of said signals affected principally by the bond between the cement sheath and formation;
    establishing a second indication indicative of said frequency; and
    correlatively recording said indications as a function of depth whereby irregularities in bonding of the cement sheath may be determined.

References Cited by the Examiner

UNITED STATES PATENTS

| | | | |
|---|---|---|---|
| 2,251,817 | 8/1941 | Athy et al. | 181—.5 |
| 2,723,375 | 11/1955 | Schuster | 324—6 |
| 2,956,634 | 10/1960 | Zemanek et al. | 181—.5 |
| 2,956,635 | 10/1960 | Summers | 181—.5 |
| 3,180,141 | 4/1965 | Alger | 340—18 |
| 3,213,415 | 10/1965 | Moser et al. | 340—18 X |
| 3,216,524 | 11/1965 | Summers | 340—18 X |

FOREIGN PATENTS 906,659  9/1962  Great Britain.

BENJAMIN A. BORCHELT, *Primary Examiner.*

R. M. SKOLNIK, *Assistant Examiner.*